UNITED STATES PATENT OFFICE 2,059,094

AZO DYESTUFFS AND THEIR PRODUCTION

Bernd Eistert, Mannheim, and Hans Krzikalla and Guido von Rosenberg, Ludwigshafen-on-the-Rhine, Germany, assignors to General Aniline Works, Inc., New York, N. Y., a corporation of Delaware No Drawing. Application August 18, 1934, Serial No. 740,532. In Germany September 6, 1933

7 Claims. (Cl. 260—80)

The present invention relates to new azo dyestuffs and to a process of producing same.

We have found that valuable new azo dyestuffs are obtained by coupling aromatic diazo compounds free from sulfonic and carboxylic acid groups but which may contain halogen, nitro groups or other substituents with aromatic ortho-hydroxycarboxylic acid amides which have no free para-position to the hydroxyl group and which only couple in ortho-position to the hydroxyl group and which contain attached to the nitrogen atom of the acid amide radicle at least one aliphatic radicle having more than five carbon atoms.

Ortho-hydroxycarboxylic acid amides of the said kind are obtainable for example by the condensation of para-cresotinic acid, 2,3-hydroxy-naphthalene carboxylic acid, 2,3-hydroxyanthracene carboxylic acid or 2,3-hydroxy carbazole carboxylic acid with primary or secondary amines having at least an aliphatic radicle containing more than five carbon atoms, such as hexylamine, dodecylamine, octodecylamine, oleylamine, methyldodecylamine, di-dodecylamine, cyclohexyldodecylamine and hexylaniline or mixtures of the said substances. Amines of the said kind are obtainable for example according to the U. S. application Ser. No. 685,188.

The dyestuffs obtainable according to this invention are yellow, red or blue to green depending on the components employed, and are distinguished by good to excellent solubility in hydrocarbons such as benzene, toluene, turpentine oil and petroleum hydrocarbons, chlorinated hydrocarbons, alcohols, ethers, ketones, paraffin waxes, fats, waxes and oils. The dyestuffs are, therefore, especially suitable for coloring the said materials and for preparing colored masses which are produced by employing the said materials, for example in the manufacture of colored nitrocellulose lacquers, films, candles, polishing waxes, shoe polish and the like.

The following examples will further illustrate how the said invention may be carried out in practice but the invention is not restricted to these examples. The parts are by weight.

Example 1

93 parts of aniline are diazotized in the usual manner and the resulting diazo solution is allowed to flow in a thin stream while stirring into a solution of 380 parts of 2,3-hydroxynaphthoic acid dodecylamide (having a melting point of 112° C.) in about 1000 parts of pyradine. A red dyestuff is obtained which crystallizes in the form of greasy leaflets and which is readily soluble in paraffin wax, oil and solvents giving an orange-red coloration. The coupling may also be carried out in aqueous suspension, for example by stirring a solution of 2,3-hydroxynaphthoic acid dodecylamide in acetone into water to which has been added a little Turkey red oil and then adding the diazo solution which has been neutralized with sodium acetate.

The following table indicates further dyestuffs obtainable in a similar manner and the color of their solutions in benzene.

| Diazo component | Coupling component | Color of solution in benzene |
|---|---|---|
| 1-amino-4-methylbenzene | 1-methyl-4-hydroxy-benzene-3-carboxylic acid decylamide. | Yellow. |
| 1-aminonaphthalene | 2,3-hydroxynaphthoic acid dodecylamide. | Red. |
| Aminoazobenzene | ...do... | Do. |
| 2-amino-1, 4-di (methoxy) benzene. | ...do... | Bluish red. |
| 1-amino-4-nitrobenzene | 2,3-hydroxynaphthoic acid dodecylamide. | Red-orange. |
| 1-amino-2-nitro-4-methyl-benzene. | ...do... | Orange-red. |
| Dianisidine | ...do... | Reddish blue. |
| 1-benzoylamino-2, 5-diethoxy-4-aminobenzene. | ...do... | Blue. |
| 1-amino-2-methoxy-diphenylamine. | 2, 3-hydroxynaphthoic acid methyldodecyl amide. | Do. |
| 1-amino-2-methoxydiphenylamine. | 2, 3-hydroxyanthracene carboxylic acid dodecylamide. | Greenish blue. |
| 4, 4'-diaminodiphenylamine. | 6-methoxy-2-hydroxynaphthalene-3-carboxylic acid oleylamide. | Black-blue. |

Example 2

245 parts of o-dianisidine are tetrazotized and, while stirring, entered into a solution of 380 parts of 2,3-hydroxynaphthoic acid dodecylamide and 145 parts of beta-naphthol in a mixture of about 1000 parts of pyridine and 500 parts of methanol. When the coupling is complete the dyestuff formed is sucked off and washed. It colors candle-material deep blue tints and is likewise suitable for coloring nitrocellulose lacquers.

If ethyl-beta-naphthylamine is employed instead of beta-naphthol a dyestuff having a somewhat more reddish color and similar properties is obtained. Instead of the 2,3-hydroxy-naphthoic acid dodecylamide one of the amides mentioned in the second paragraph on page 1 may be employed. Instead of beta-naphthol, para-cresol, para-cyclohexylphenol, 2,4-hydroxyquinoline, methylphenylpyrazolone, aceto acetic acid anilide or other coupling components having no groups which render the dyestuffs water-soluble may be employed.

What we claim is:

1. A process for producing azo dyestuffs which comprises coupling aromatic diazo compounds free from sulfonic and carboxylic acid groups with aromatic ortho-hydroxycarboxylic acid amides which have no free para-position to the hydroxyl group and which only couple in ortho-position to the hydroxyl group and which contain attached to the nitrogen atom of the acid amide radicle at least one aliphatic radicle having more than five carbon atoms.

2. Azo dyestuffs corresponding to the general formula:

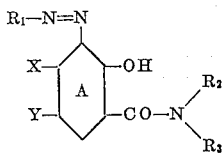

wherein $R_1$ stands for the radicle of an aromatic diazo compound, $R_2$ for a member of the group consisting of hydrogen, alkyl, cycloalkyl and aryl, $R_3$ for an alkyl group containing more than five carbon atoms, X for hydrogen and Y at the same time for an alkyl group, or wherein X and Y jointly represent an aromatic nucleus condensed with the benzene nucleus marked "A".

3. Azo dyestuffs corresponding to the general formula:

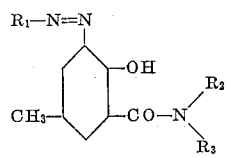

wherein $R_1$ stands for the radicle of an aromatic diazo compound, $R_2$ for a member of the group consisting of hydrogen, alkyl, cycloalkyl and aryl and $R_3$ for an alkyl group containing more than five carbon atoms.

4. Azo dyestuffs corresponding to the general formula:

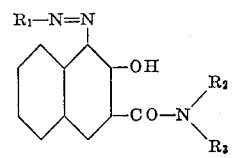

wherein $R_1$ stands for the radicle of an aromatic diazo compound, $R_2$ for a member of the group consisting of hydrogen, alkyl, cycloalkyl and aryl and $R_3$ for an alkyl group containing more than five carbon atoms.

5. The azo dyestuff corresponding to the formula:

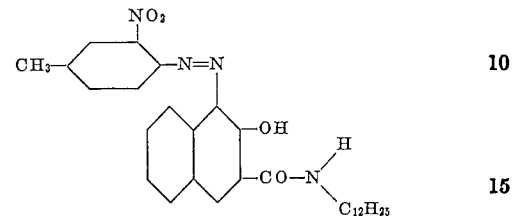

6. Azo dyestuffs corresponding to the general formula:

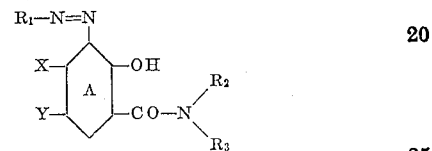

wherein $R_1$ stands for the radicle of a tetrazo compound the other diazo group of which is coupled with a coupling component selected from the class consisting of phenols and naphthols, $R_2$ for a member of the group consisting of hydrogen, alkyl, cycloalkyl and aryl, $R_3$ for an alkyl group containing more than five carbon atoms, X for hydrogen and Y at the same time for an alkyl group, or wherein X and Y jointly represent an aromatic nucleus condensed with the benzene nucleus marked "A".

7. The azo dyestuff corresponding to the formula:

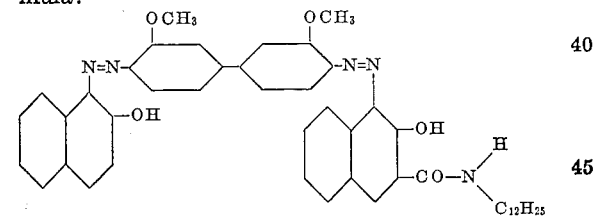

BERND EISTERT.
HANS KRZIKALLA.
GUIDO von ROSENBERG.